(12) United States Patent
Hino

(10) Patent No.: US 10,180,549 B1
(45) Date of Patent: Jan. 15, 2019

(54) OPTICAL TRANSCEIVER

(71) Applicant: SUMITOMO ELECTRIC DEVICE INNOVATIONS, INC., Yokohama-shi (JP)

(72) Inventor: Masato Hino, Yokohama (JP)

(73) Assignee: SUMITOMO ELECTRIC DEVICE INNOVATIONS, INC., Yokohama-shi (JP)

( * ) Notice: Subject to any disclaimer, the term of this patent is extended or adjusted under 35 U.S.C. 154(b) by 0 days.

(21) Appl. No.: 16/026,373

(22) Filed: Jul. 3, 2018

(30) Foreign Application Priority Data

Jul. 4, 2017 (JP) ................. 2017-131419

(51) Int. Cl.
G02B 6/42 (2006.01)
G02B 6/38 (2006.01)

(52) U.S. Cl.
CPC ........ G02B 6/4261 (2013.01); G02B 6/4246 (2013.01); G02B 6/4277 (2013.01); G02B 6/4292 (2013.01); G02B 6/3897 (2013.01)

(58) Field of Classification Search
CPC .................................................. G02B 6/4277
See application file for complete search history.

(56) References Cited

U.S. PATENT DOCUMENTS

| 7,530,845 | B1 * | 5/2009 | Yang ................... | G02B 6/4201 439/607.01 |
| 7,597,590 | B2 * | 10/2009 | McColloch .......... | G02B 6/4201 29/874 |
| 7,928,324 | B2 * | 4/2011 | Moore ................. | G02B 6/4246 174/354 |
| 9,039,300 | B2 * | 5/2015 | Kondo .................. | G02B 6/426 385/92 |
| 2009/0130917 | A1 * | 5/2009 | Lloyd .................. | G02B 6/4277 439/701 |
| 2009/0196008 | A1 * | 8/2009 | McColloch .......... | G02B 6/4201 361/818 |
| 2010/0310215 | A1 * | 12/2010 | Yoshikawa .......... | G02B 6/4201 385/92 |
| 2011/0206328 | A1 * | 8/2011 | Wang ................... | G02B 6/4246 385/94 |
| 2012/0148201 | A1 | 6/2012 | Kondou et al. | |
| 2012/0288240 | A1 | 11/2012 | Kondo et al. | |
| 2015/0256260 | A1 * | 9/2015 | Kurashima .......... | G02B 6/4277 398/135 |
| 2016/0299296 | A1 * | 10/2016 | Sano .................... | G02B 6/3838 |
| 2017/0160502 | A1 * | 6/2017 | Zhao ................... | G02B 6/4277 |
| 2017/0363820 | A1 * | 12/2017 | Hino .................... | G02B 6/3817 |

FOREIGN PATENT DOCUMENTS

JP          2013-029539 A          2/2013

* cited by examiner

*Primary Examiner* — Michelle R Connelly
(74) *Attorney, Agent, or Firm* — Venable LLP; Michael A. Sartori; Miguel A. Lopez

(57) ABSTRACT

A pluggable optical transceiver is disclosed where the optical transceiver provides a housing, a lid, and a shield finger. The lid and the shield finger are assembled with the housing such that the shield finger fastens the lid against the housing. The housing provides a pocket that receives an end of the shield finger. The pocket provides negative slopes to gradually widen the cross section thereof as advancing a bottom of the pocket. The shield finger provides a tab in an end thereof, where the tab is bent inward to be hooked with the negative slope of the pocket.

2 Claims, 16 Drawing Sheets

OPTICAL TRANSCEIVER

CROSS REFERENCE TO RELATED APPLICATION

The present application is based on and claims the benefit of priority of Japanese Patent Application No. 2017-131419, filed on Jul. 4, 2017, the entire content of which is incorporated herein by reference.

BACKGROUND OF THE INVENTION

1. Field of the Invention

The present invention relates to an optical transceiver, in particular, the invention relates to an arrangement of a pluggable optical transceiver.

2. Related Background Arts

A Japanese Patent laid open number of JP-2013-029539A has disclosed an optical transceiver implementing a receiver optical module and a transmitter optical module. The optical transceiver disclosed therein includes a housing and a circuit board enclosed within the housing. The housing comprises a lower housing having sides and a bottom, and an upper housing including a lid. This optical transceiver may enclose the optical modules and the circuit board by hooking a front end of the upper housing with a front end of the lower housing and rotating the upper housing in a rear portion thereof downward around a hooked point between the lower and upper housings, and hooking the rear end of the upper housing with the rear end of the lower housing.

SUMMARY OF THE INVENTION

An aspect of the present invention relates to an optical transceiver that provides a housing, a lid, and a shield finger. The housing has a bottom and a pair of sides built from respective sides of the bottom. The lid, which is provided on the sides of the housing, which forms a space into which optical and electrical components are installed, provides a pocket. The shield finger, which surrounds the lid and the housing, fastens the lit to the housing. The shield finger has two ends facing to each other and having tabs that are hooked within the pockets of the lid. Features of the optical transceiver of the present invention are that the pocket is formed by two slopes extending from surface of the lid and making acute angles against the surface, and the tabs in the shield finger are bent in acute angles corresponding to the acute angles of the slopes of the pocket, which may securely hook the tab with the slopes.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, embodiments of an optical transceiver according to the present invention will be described as referring to drawings. However, the present invention is not restricted to those embodiments, and has a scope defined in claims presented below and all modifications and changes based on those defined in claims including equivalents thereto. In the description of the embodiments, numerals or symbols same with or similar to each other will refer to elements same with or similar to each other without duplicating explanations.

Figure 1:
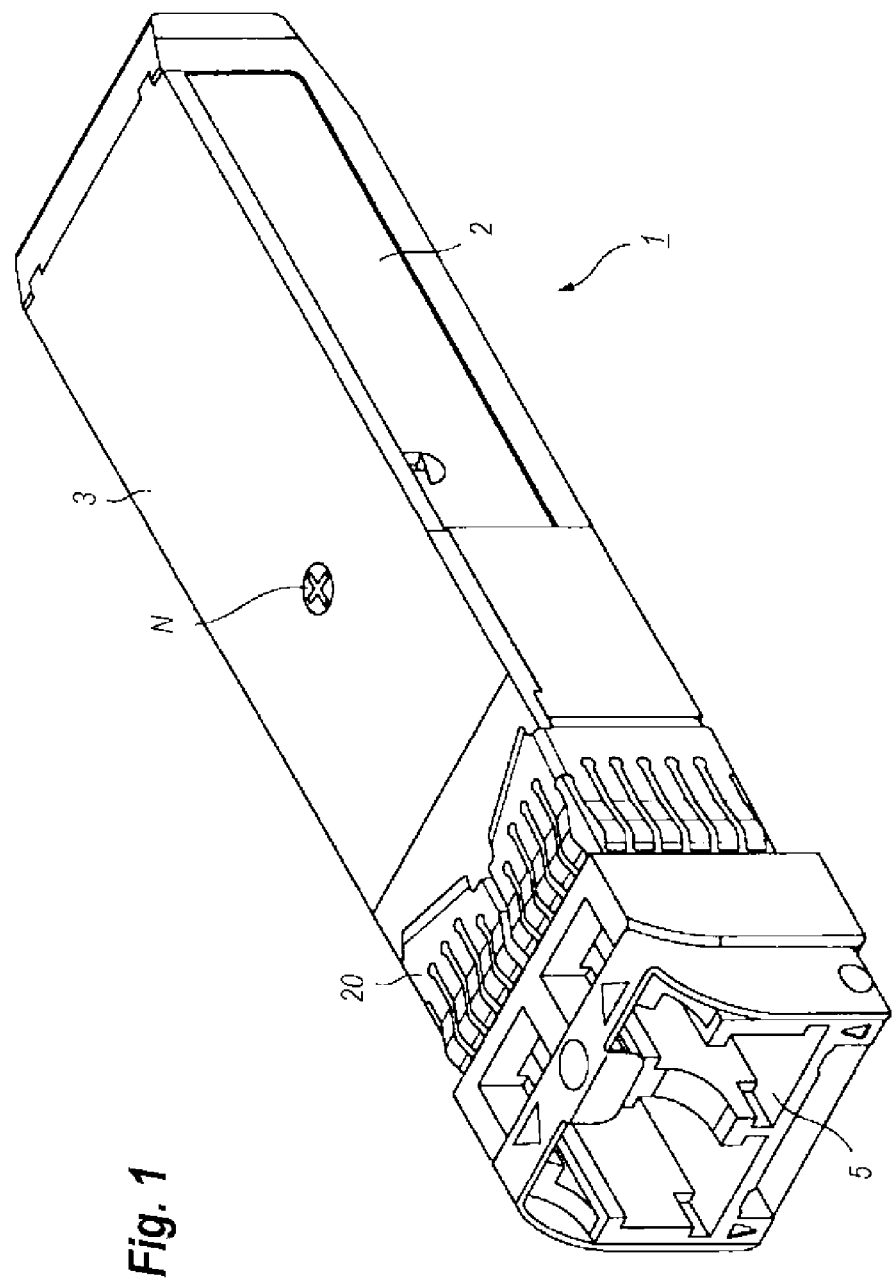
FIG. 1 is a perspective view showing an optical transceiver according to the present invention.
Figure 2:
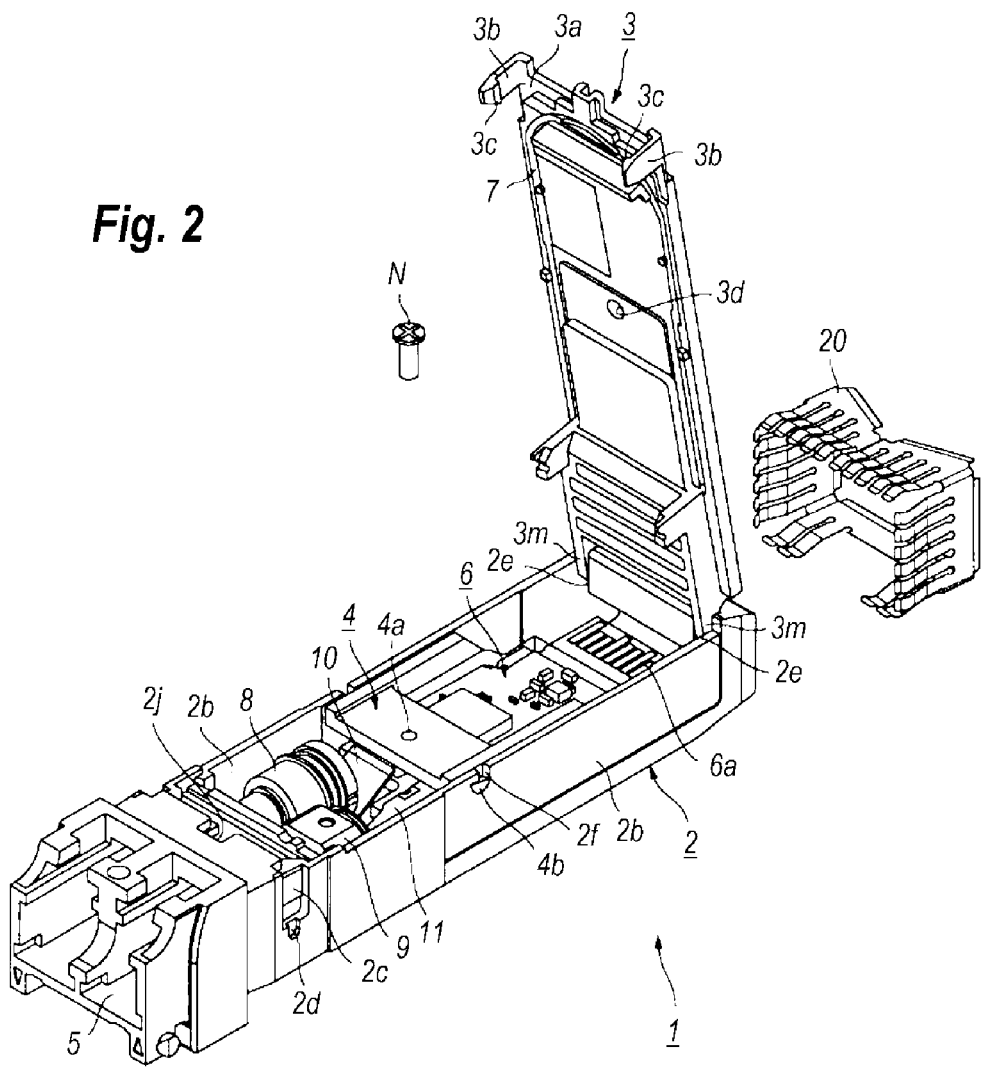
FIG. 2 is a perspective view showing an inside of the optical transceiver.

FIG. 1 is a perspective view showing an optical transceiver 1 according to the present invention; and FIG. 2 is also a perspective view of the optical transceiver 1 where FIG. 2 shows an inside of the optical transceiver 1. The optical transceiver 1 of the present embodiment is a type of pluggable optical transceiver that is engaged with a host system by inserting the optical transceiver 1 within a cage prepared in the host system along a longitudinal direction thereof. The optical transceiver 1 comprises a housing 2, a lid 3, an inner lid 4, an optical receptacle 5, a circuit board 6, and a shield finger 20. In the description below, directions of "forward", "front", and so on correspond to a side where the optical receptacle 5 is provided; while another directions of "rear", "back", and so on correspond to another side opposite to the former side. Also, a longitudinal direction is along a direction connecting the front with the rear, while, a lateral direction is perpendicular thereto. However, those definitions of the directions are merely explanation sake, and may provide no influence of the scope of the present invention.

Figure 3:
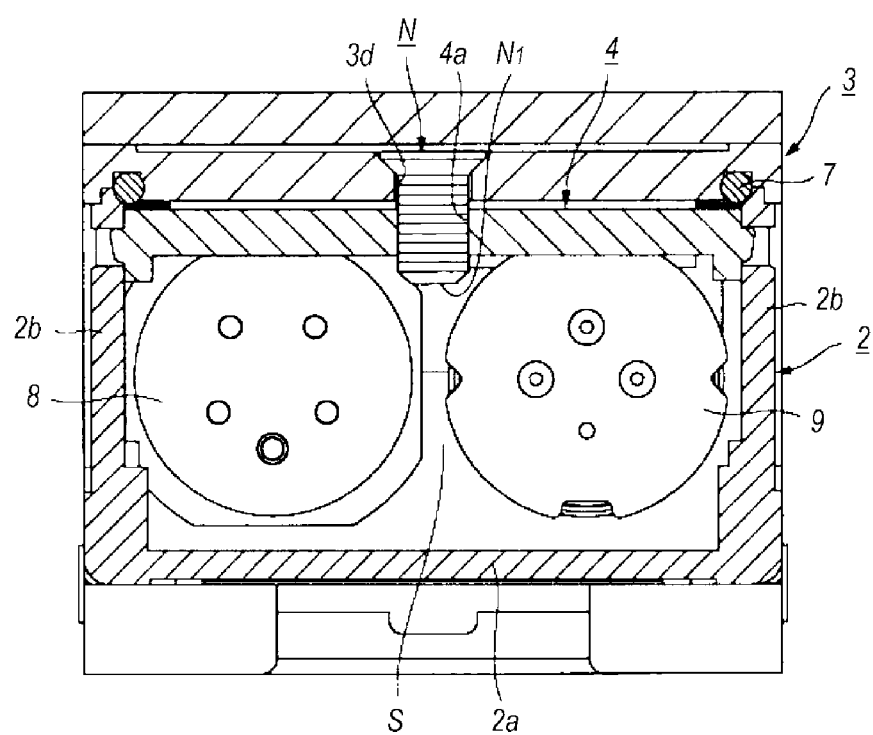
FIG. 3 shows an assembled structure of the optical transceiver by showing a cross section thereof.

FIG. 3 shows an assembled structure of the optical transceiver 1 by showing a cross section thereof. The housing 2, which encloses optical and electrical components therein, includes a bottom 2a and a pair of sides 2b built in respective edges of the bottom 2a. The sides 2b provide receptions, 2c and 2d, in a front side of the housing 2. The latter reception 2d is framed below the former reception 2c; accordingly, the specification below calls the former reception 2c as an upper reception, while, the latter as a lower reception. Also, the sides 2b provide rear pockets 2e and cuts 2f in respective rear ends, where the rear pockets 2e receive a rear end of the lid 3, which the cuts 2f are provided in center portions of the sides 2b that receive projections 4b provided in the inner lid 4.

The housing 2 and the lid 3 form a space S where the optical components and the electrical components are enclosed. The lid 3 in a front end thereof provides legs 3b extruding downward from an inner surface of the lid 3 and hooks 3c in tips of the legs 3b protruding inward. The legs 3b and the hooks 3c are to be engaged with the upper receptions 2c and the lower receptions 2d, respectively.

The housing 2, the lid 3, and the inner lid 4, which are made of metals, may effectively shield the space S, that is, electrical noises induced within the space S may be suppressed from leaking out of the space S. Moreover, the optical transceiver 1, provides a gasket 7 between the housing 2 and the lid 3, specifically, the gasket 7 first longitudinally extends from the rear to the front along an edge of the lid 3, then laterally extends from the left to the right at the front end of the lid 3, then longitudinally extends again from the front to the rear along another edge of the lid 3. Thus, the gasket 7 has a plane shape of a U-character. The inner lid 4 may be made of resin and/or metal, in particular, the metal inner lid 4 may secure a heat dissipation path from electronic circuit mounted on the circuit board 6 to the lid 3.

The inner lid 4 provides a screw hole 4a in a center thereof; while, the lid 3 provides a hole 3d through which a screw N engages with the screw hole 4a in the inner lid 4. The hole 3d is to be aligned with the screw hole 4a when the lid 3 is assembled with the housing 2, exactly, with the inner lid 4. Engaging the screw N with the screw hole 4a passing the hole 3d in the lid 3, the lid 3 is to be assembled with the housing 2. The screw N has a length to leave a gap against the circuit board 6 when the screw N is engaged with the screw hole 4a.

The optical receptacle 5 in the front end of the housing 2 receives an external optical connector, which is not illustrated in figures. The optical receptacle 5 in the present embodiment is integrally formed with the housing 2. The circuit board 6 provides an electrical plug 6a in the rear end thereof. Mating the plug 6a with an electrical connector prepared in a host board on which the optical transceiver 1 is to be mounted, the optical transceiver 1 may electrically communicate with the host system.

The space S formed by the housing 2 and the lid 3 encloses, in addition to the circuit board 6, a transmitter optical sub-assembly (TOSA) 8, a receiver optical sub-assembly (ROSA) 9, and two flexible printed circuit (FPC) boards, 10 and 11. Those components of the circuit board 6, the TOSA 8, the ROSA 9, and the FPC boards, 10 and 11, form an intermediate assembly M, refer to FIG. 13. The TOSA 8 and the ROSA 9 are disposed side by side along the lateral direction of the housing 2. The FPC board 10 electrically connects the TOSA 8 with the circuit board 6, while, another FPC board 11 electrically connects the ROSA 9 with the circuit board 6.

The ROSA 9 installs an actuator that converts an optical signal provided outside of the optical transceiver 1 into an electrical signal that is provided to a receiver circuit on the circuit board 6 through the FPC board 11. The receiver circuit processes thus transferred electrical signal, for instance, amplifies, reshapes, re-timings, and recovers data contained therein. The recovered data is provided to the host system through the electrical plug 6a. The TOSA 8 installs another actuator that converts an electrical signal into an optical signal that is output from the optical receptacle 5.

The electrical signal is provided from the host system through the electrical plug 6a, a driver on the circuit board 6, and the FPC board 10.

Figure 4:
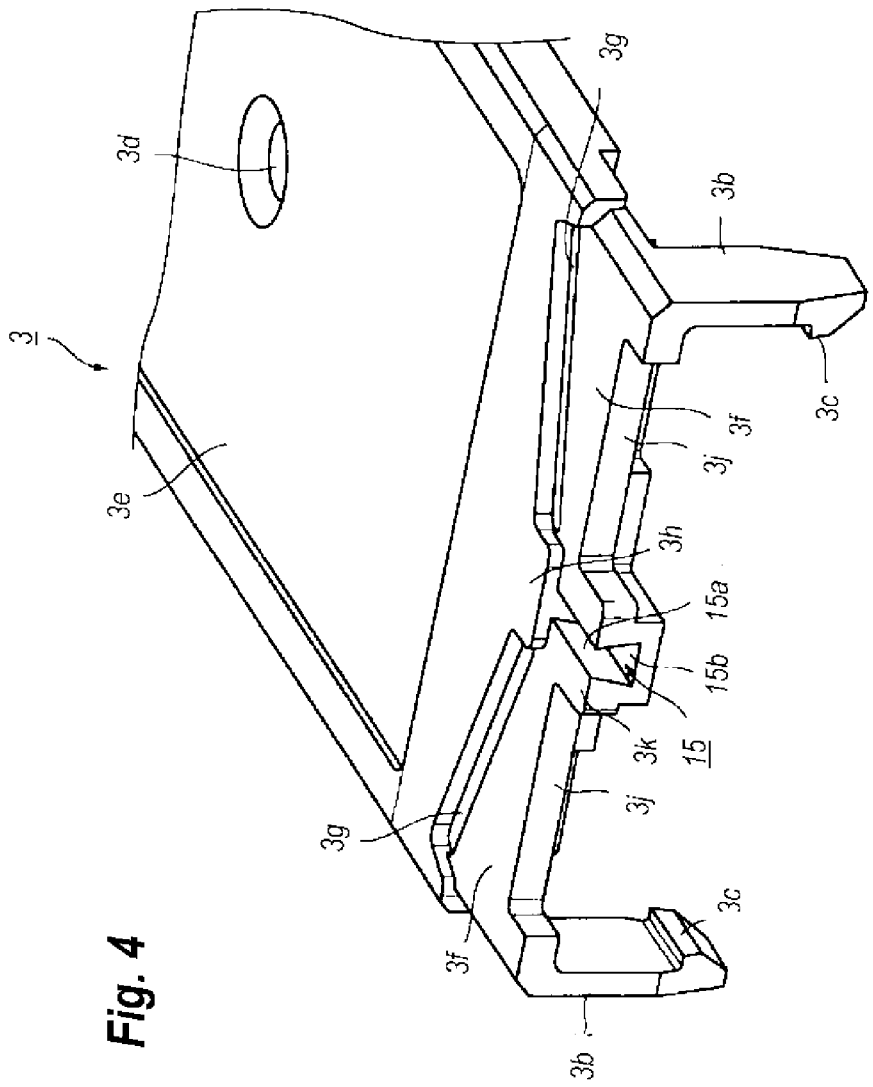
FIG. 4 is a perspective view showing a front portion of the lid.

FIG. 4 is a perspective view showing a front portion of the lid 3. The lid 3 provides a top surface 3e with the hole 3d and steps 3f in the front end thereof, where the steps 3f receive a root 22 of the shield finger 20. The steps 3f gradually expand from a center to edges of the lid 3; specifically, the rear ends of the steps 3f gradually retreat rearward from the center to the edges of the lid 3.

Figure 5:
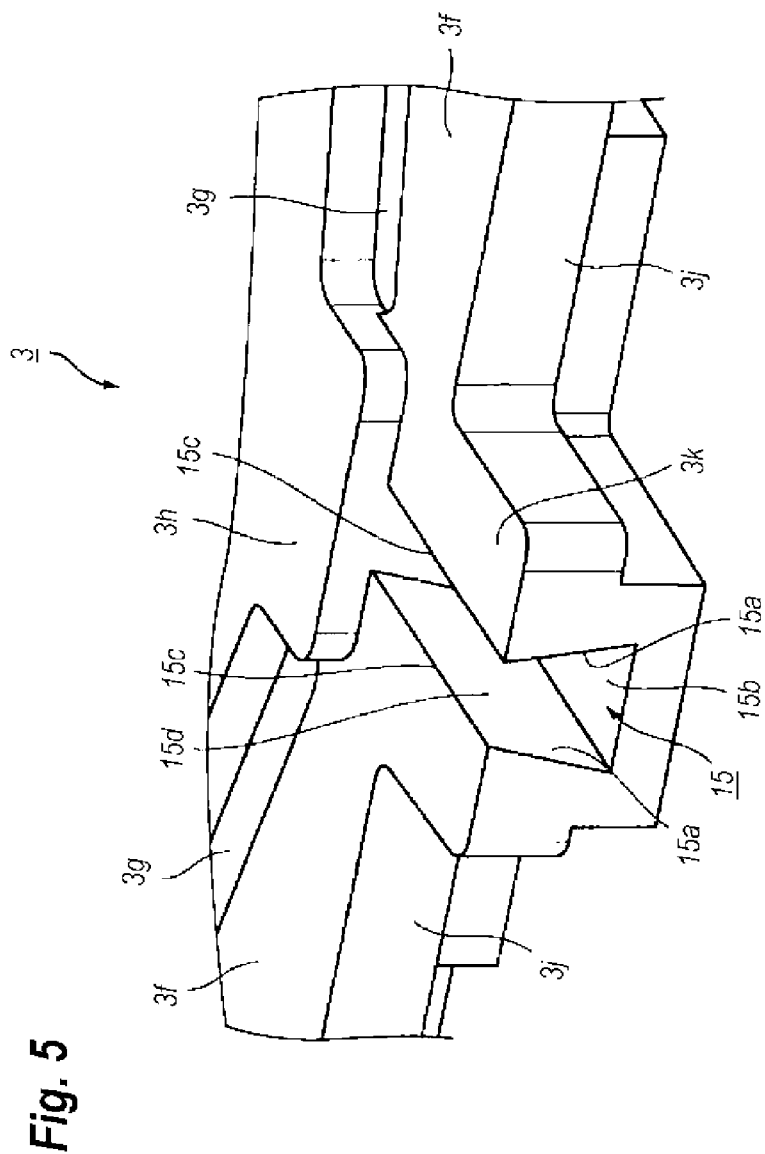
FIG. 5 magnifies a center of the front portion of the lid.

FIG. 5 magnifies a center of the front end of the lid 3. The steps 3f accompany with grooves 3g in respective rear ends. Provided between the grooves 3g is a terrace 3h in a center of the lid 3. Also, the front edge 3j of the lid 3 in a center thereof forwardly protrudes to form an extension 3k that is to be inserted within a front pocket 2j of the housing 2. The extension 3k and the front pocket 2j are covered with the root 22 of the shield finger.

The lid 3 provides the pocket 15 that receives the shield finger 20 to fasten the shield finger 20 with the lid 3. The pocket 15 extends from an end of the terrace 3h to the end of the extension 3k. The pocket 15 provides a pair of sides 15a and a bottom 15b. The present embodiment provides the sides 15a and the bottom 15b each having flat surfaces; but the sides 15a and/or the bottom 15b may have curved and/or bumpy surfaces.

The sides 15a may have negative slopes 15d; specifically, the sides 15a in a gap therebetween narrows from the bottom 15b to a slit 15c at a top surface of the extension 3k; that is, the pocket 15 in a cross section thereof has a trapezoid. FIG. 4 and FIG. 5 show the negative slopes 15d in whole sides 15a of the pocket 15; but the negative slopes 15d may be partially formed in the sides 15a. The slit 15c longitudinally extends at the top of the extension 3k.

Figure 6:
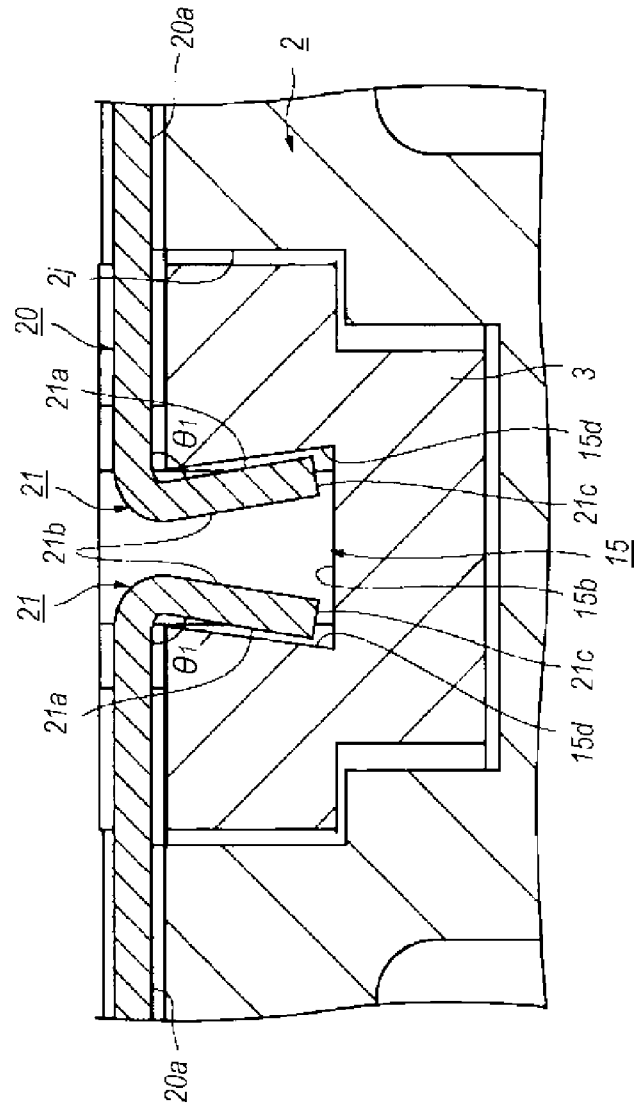
FIG. 6 shows a cross section of a pocket that catches tabs of the shield finger.
Figure 7:
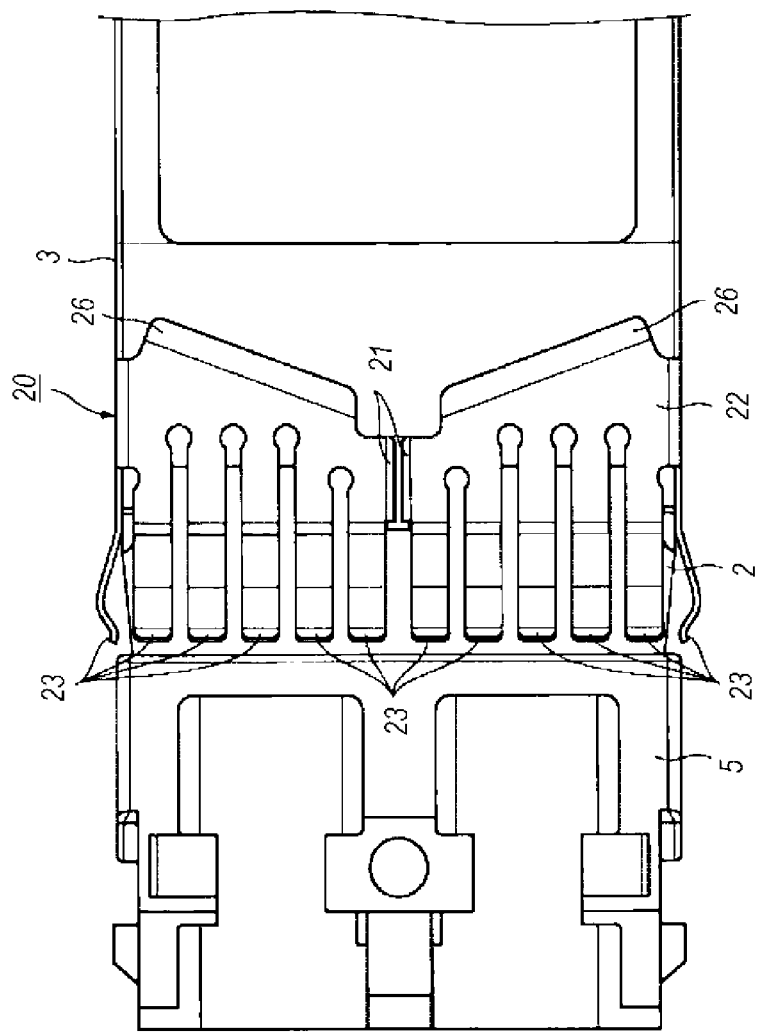
FIG. 7 is a plan view showing the shield finger whose tabs are set within the pocket.

FIG. 6 shows a cross section of the pocket 15 catching tabs 21 of the shield finger 20; while, FIG. 7 is a plan view showing the shield finger 20 whose tabs 21 are set within the pocket 15. The shield finer 20, which may be made of metals, surrounds the housing 2 and the lid 3 assembled with the housing 2; specifically, the shield finger 20 is assembled with the housing 2 and the lid 3 so as to surround the housing 2 and the lid 3; and elastically makes contact with the cage into which the optical transceiver 1 is inserted. The shield finger 20 provides, in addition to the root 22 and the tab 21 described above, fingers 23 extending along the housing 2 from the root 22.

The tab 21, which is hooked with the negative slope 15d in the pocket 15 as being bent along a longitudinal direction of the housing 2, includes an inner face 21a, an outer face 21b, and an edge 21c, where the inner face 21a faces and is in contact with the negative slope 15d, the outer face 21b faces another outer face 21b, and the edge 21c faces the bottom 15b of the pocket 15 but not in contact therewith. The inner face 21a is a flat surface, and the outer face 21b is also a flat surface. Because the tab 21 engages with the negative slope 15d of the pocket 15, the tab 21 in the inner face 21a thereof makes an acute angle $\theta_1$ with respect to a bottom surface 20a of the shield finger 20, exactly, the root 22 of the shield finger 20, which may securely assemble the shield finger 20 with the housing 2 and the lid 3 to prevent the shield finger 20 detached from the housing 2.

Figure 8:
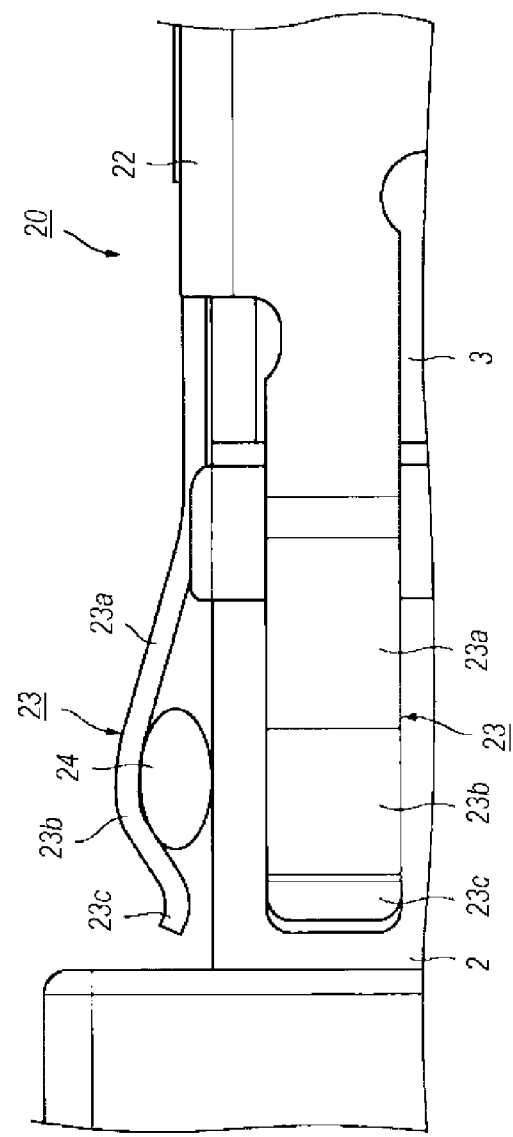
FIG. 8 is a side view of the shield finger, in particular, the fingers thereof putting an elastic member thereunder against the lid.

Referring to FIG. 7, the shield finger 20 provides edges 26 bent inward and set within the grooves 3g in the lid 3. The edges 26 are slanted laterally and longitudinally. The edges 26 set within the grooves 3g may effectively prevent the shield finger 20 from moving longitudinally. FIG. 8 is a side view of the shield finger 20, in particular, fingers 23 thereof.

The finger 23 provides a root portion 23a, a warp portion 23b, and a tip portion 23c, where the root portion 23a expands outwardly from the root 22, the warp portion 23b is warped outwardly, and the tip portion 23c is warped inwardly.

Figure 9:
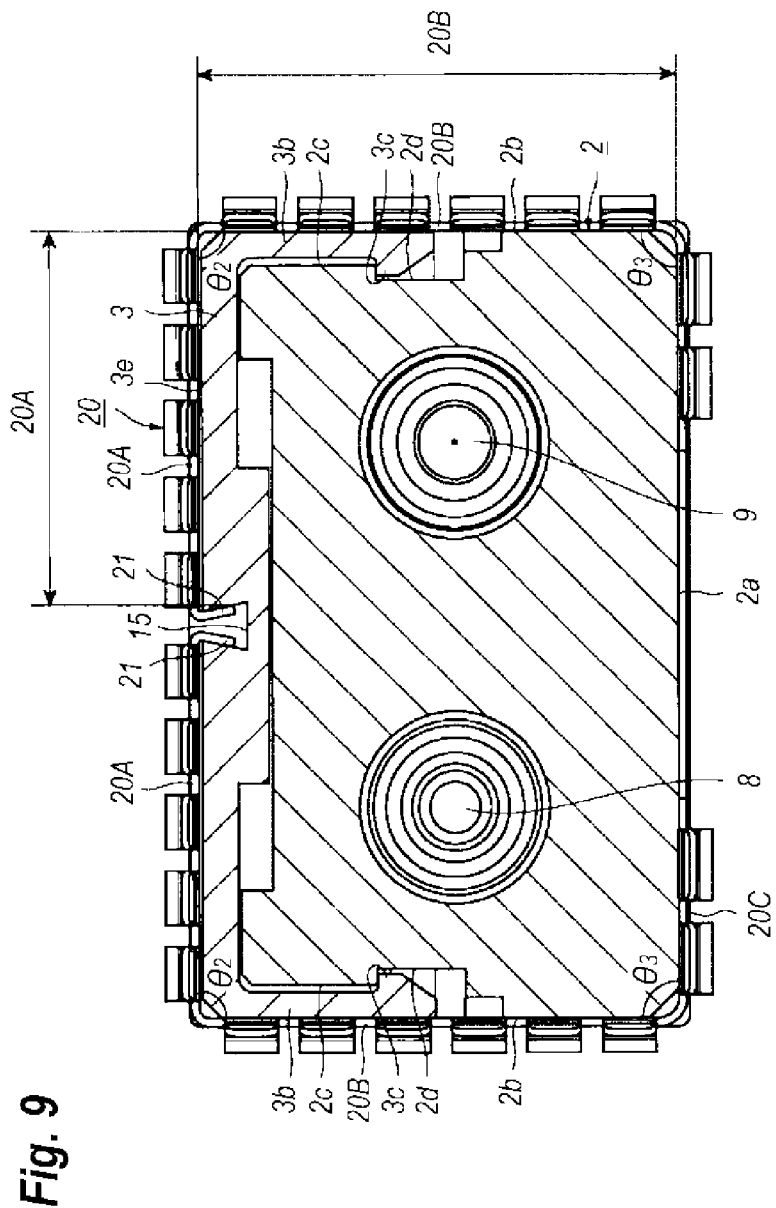
FIG. 9 shows a cross section of the shield finger, the lid, and the housing.

Provided between the warp portion 23b and the housing 2 is an elastic material 24 that may be an elastic tube, a sponge, a felt, and so on. The elastic material 24 may be a material showing substantial electrical conductivity, or may be an insulating material. An elastic material 24 made of material having electrical conductivity may enhance a function of shielding against electro-magnetic interference (EMI). FIG. 9 shows a cross section of the shield finger 20, the lid 3 and the housing 2. The shield finger 20 covers the housing 2 and the lid 3; specifically, the shield finger 20 covers and protects the leg 3b and the hook 3c each set within the upper and lower receptions, 2c and 2d, by rounding around the housing 2 and the lid 3.

Specifically, the shield finger 20 has a top portion 20A over the lid 3, a side portion 20B covering the side 2b of the housing 2, namely, the leg 3b with the hook 3c in the lid 3, and the upper and lower receptions, 2c and 2d, in the housing 2, and a bottom portion 20C under the housing 2. The top portion 20A extends from the pocket 15 to the side of the housing 2 attaching with the top surface of the lid 3. The top portion 20A has dimensional accuracy, in particular, a length from the side to the pocket 15, that is higher than dimensional accuracy in the side portion 20B, which means that the shield finger 20 in the tabs 21 thereof is securely hooked within the pocket 15 and tightly bound around the housing 2. Moreover, an angle $\theta_2$ between the top and side portions, 20A and 20B, is set slightly smaller than another angle $\theta_3$ between the side and bottom portions, 20B and 20C, which also securely binds the shield finger 20 around the housing 2.

Figure 10:
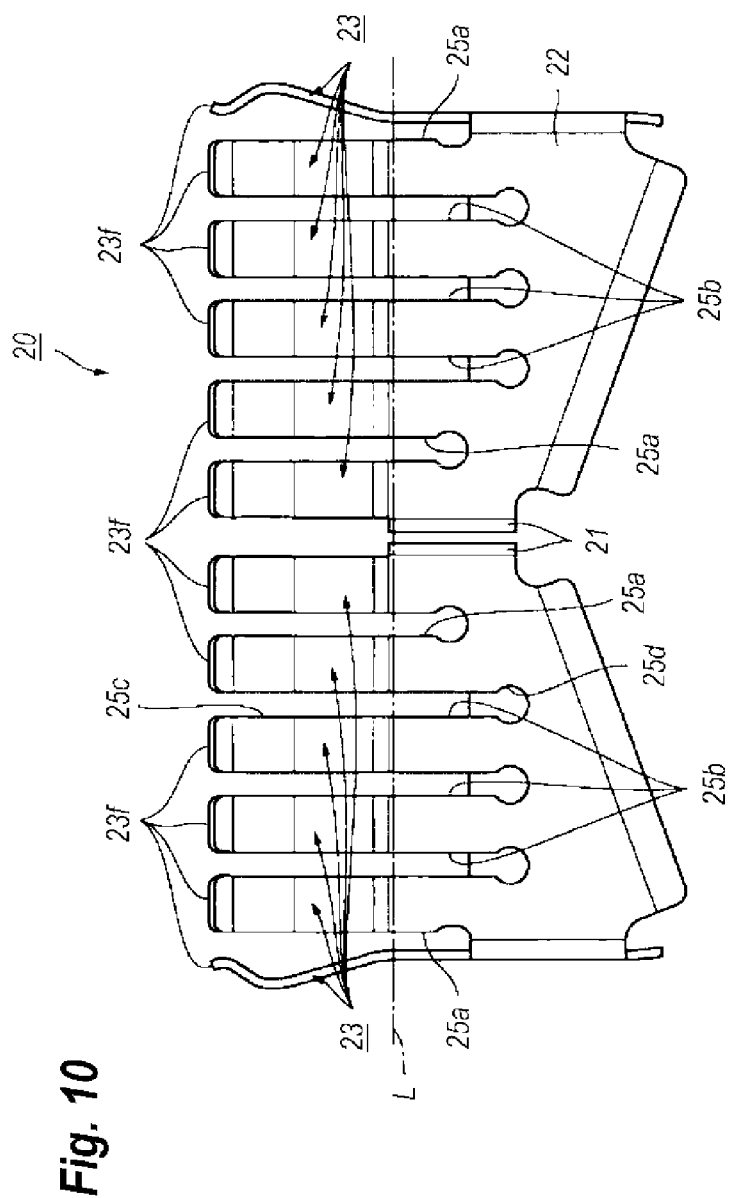
FIG. 10 shows a top view of the shield finger.
Figure 11:
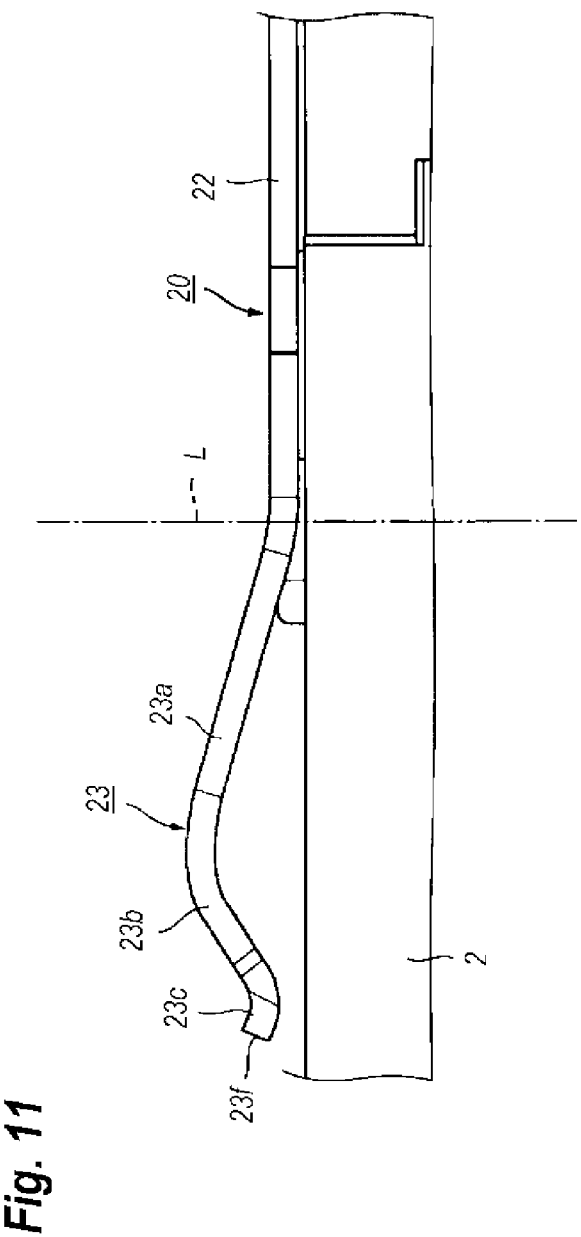
FIG. 11 is a side view of one of fingers in the shield finger and the housing.

FIG. 10 shows a top view of the shield finger 20, while, FIG. 11 is a side view of one finger 23. The shield finger 20, as described above, includes the root 22 and the fingers 23 accompanied with slits 25a and 25b therebetween, where the fingers 23 with the slits 25a and 25b extend along the longitudinal direction of the housing 2. The shield finger 20 provides two types of the slits 25a and 25b, that is, one of the types 25a are arranged in respective ends of the root 22, namely, arranged in closest to the tabs 21, while, the other type of the slits 25b are arranged apart from the tabs 21. The former type 25a has a length shorter than that of the latter type 25b but both types of the slits, 25a and 25b, extend from the edges 23f of the fingers 23 to the root 22 beyond a virtual line L at which the fingers 23 bend upward. The slits, 25a and 25b, include linear portions 25c extending from the edges 23f and end apertures 25d having a circular shape with a diameter slightly greater than a width of the linear portion 25c.

Figure 12:
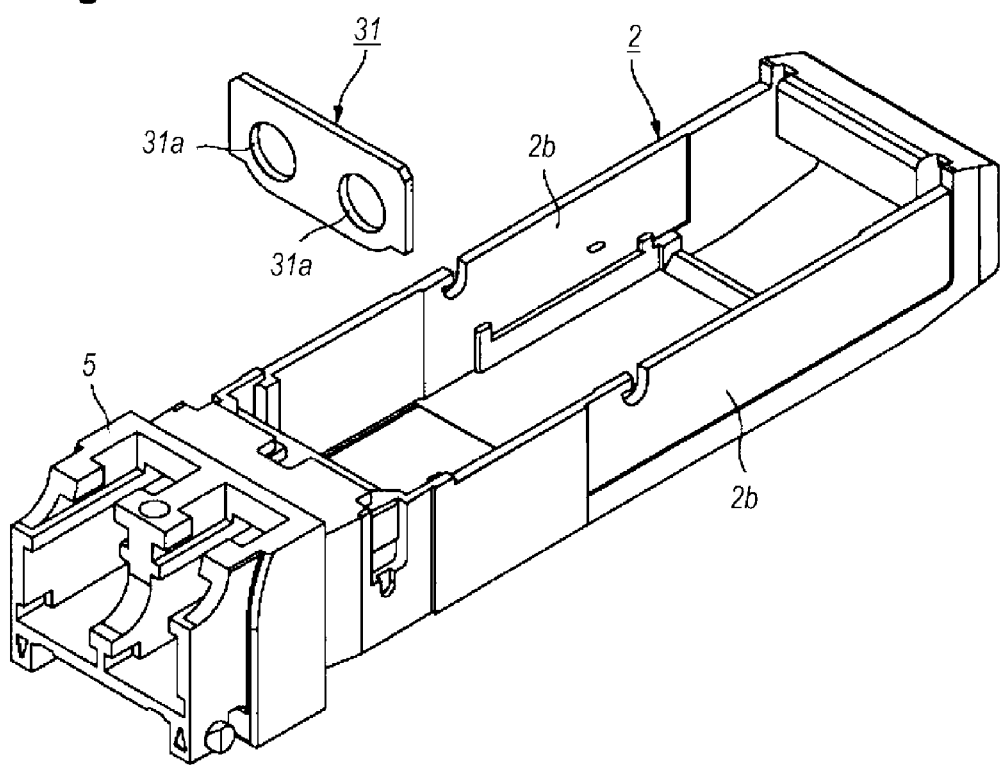
FIG. 12 is perspective views of the housing, the optical receptacle, and a partition that is to be installed within the housing.
Figure 13:
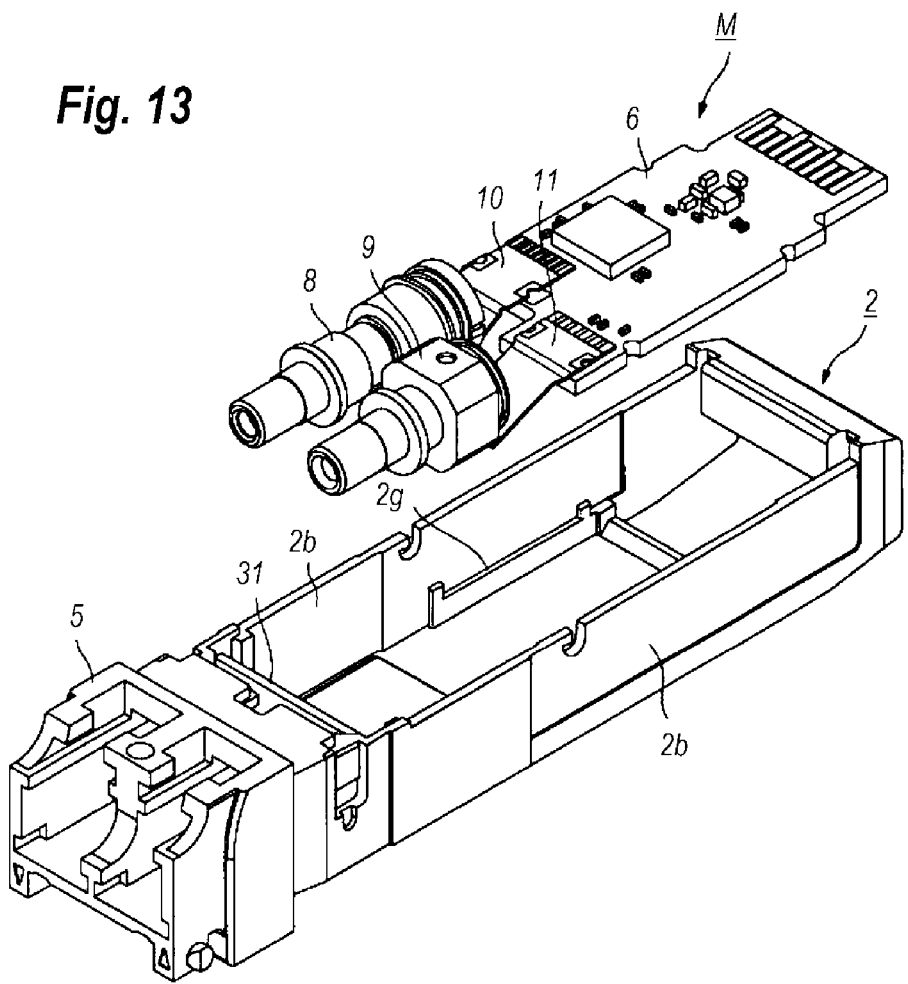
FIG. 13 shows a process of installing an intermediate product within the housing, where the intermediate produce is assembled independent of the housing.

Next, a process of assembling the optical transceiver 11 will be described. FIG. 12 is perspective views of the housing 2 with the optical receptacle 5 and a partition 31 that is made of electrically conductive rubber. The partition 31 provides two openings 31a which the TOSA 8 and the ROSA 9 in respective front portions pass therethrough. The process first sets the partition 31 in grooves formed inside of the sides 2b. Concurrently with the insertion of the partition 31, the process may assemble an intermediate assembly M independent of the housing 2, as shown in FIG. 13. Specifically, circuit components are soldered on the circuit board 6, and the TOSA 8 and the ROSA 9 are connected with the circuit board 6 through the FPC boards, 10 and 11, respectively, where the TOSA 8 and the ROSA 9 in respective actuators therein are optically aligned; that is, the actuators such as a laser diode in the TOSA 8 and/or a photodiode in the ROSA 9 are optically aligned with an optical fiber assembled with the TOSA 8 and the ROSA 9. Setting the circuit board 6 on a step formed inside of the sides 2b of the housing 2 and inserting front cylinders of the TOSA 8 and the ROSA 9 into the openings 31a from the rear, the inter mediate assembly M is installed within the housing 2.

Figure 14:
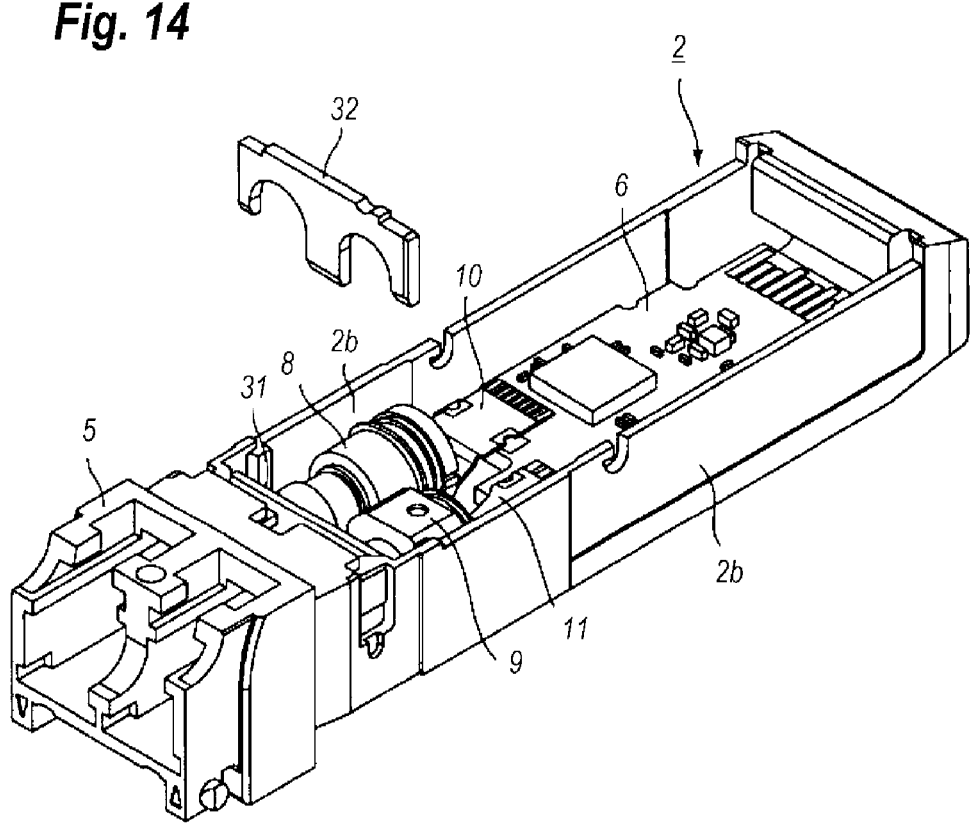
FIG. 14 shows a process of setting a holder within the housing.

Thereafter, as shown in FIG. 14, a holder 32 is set within the housing 2. The holder 32 may be made of electrically conductive material, typically, SUS304, SUS301 and so on. The holder 32 may fix the respective front cylinders of the TOSA 8 and the ROSA 9 with the housing 2. Specifically, the holder 32, which locates behind flanges of the respective front cylinders, pushes the flanges against the rear wall of the optical receptacle 5. Thus, the TOSA 8 and the ROSA 9 may be reliably fixed with the housing 2.

Figure 15:
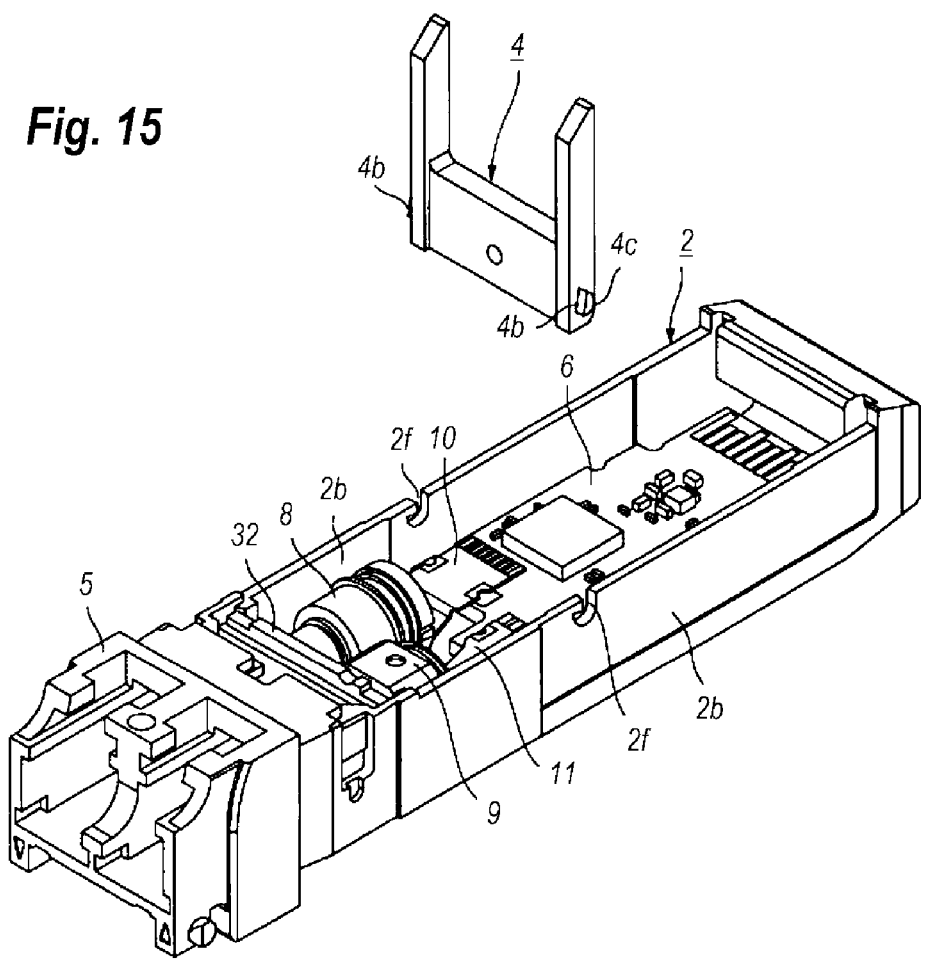
FIG. 15 shows a process of assembling the inner lid with the housing.

Thereafter, as shown in FIG. 15, the process sets the inner lid 4 in the housing 2. Applying a thermal grease on electrical components on the circuit board 6, and holding the inner lid 4 such that the projection 4b is above the cut 2f in the side 2b, the inner lid 4 is to be assembled with the housing 2 by inserting the projection 4b into the cut 2f as facing the arched surface 4c thereof rearward. Inserting the projection 4b into the deep end of the cut 2f, then rotating the inner lid 4 rearward with the projection 4b as a center of the rotation such that the arched surface 4c facing rearward faces downward, the inner lid 4 may be assembled with the housing 2.

Thereafter, the lid 3 is assembled with the housing 2 as shown in FIG. 2. Specifically, extensions 3m provided in the rear end of the lid 3 are inserted into rear pockets 2e provided in the rear end of the sides 2b of the housing 2, which supports the lid 3 by the sides 2b of the housing 2, and rotating the lid 3 frontward by the extensions 3m as a center of the rotation, the lid 3 may be disposed above the inner lid 4. The rotation of the lid 3 may engage the leg 3b and the hook 3c in the lid engage with the upper and lower receptions, 2c and 2d, which assembles the lid 3 with the housing 2. Fastening the inner lid 4 with the lid 3 by fastening the screw N with the screw hole 4a through the hole 3d, the lid 3 may be tightly assembled with the housing 2. Thus, the assembly of the optical transceiver 1 may be completed.

Next, advantages of the optical transceiver 1 according to the present embodiment will be described. The optical transceiver 1 provides the pocket 15 in the lid 3 that forms the space S cooperating with the housing 2, where the pocket 15 catches and hooks the tabs 21 in the shield finger 20. The pocket 15, which provides the negative slopes 15d, gradually expands an area thereof from the slit 15c to the bottom 15b. This arrangement of the pocket 15 may securely hook the tab 21 and effectively prevent the tab 21 from slipping out from the pocket 15. Thus, the shield finger 20 is hard to be detached from the lid 3, and the lid 3 is hard to be disassembled with the housing 2. Also, the tab 21 in the shield finger 20 makes an acute angle against the root 22 thereof, which means that the tab 21 is securely hooked with the negative slope 15d of the pocket 15 and tightly fastened with the pocket 15.

The shield finger 20 provides the root 22 and the fingers 23 with slits 25a and 25b therebetween, where the fingers 23 and the slits, 25a and 25b, extend along the longitudinal direction of the housing 2. The shield finger 20 of the present embodiment provides two type of the slits 25a and 25b, one of which 25a is disposed closest to the tab 21 and has a shorter length. These arrangements of the two types of the slits, 25a and 25b, may expand the range of the elastic force. Also, the slits, 25a and 25b, each extend beyond the position at which the finger 23 is bent. This arrangement of the fingers 23 and the slits, 25a and 25b, may enhance toughness of the finger 23, that is, may effectively suppress fatigue caused in the finger 23.

The optical transceiver 1 further provides the elastic member 24 put between the shield finger 23 and the housing 2, where the elastic member 24 may push the finger 23 against the cage in the host system when the optical transceiver 1 is set therein and make secure contact against the cage. The shield finger 20, which provides the top portion 20A, the side portion 20B, and the bottom portion 20C, makes the angle $\theta_2$ between the top portion 20A and the side portion 20B that is smaller than the angle $\theta_3$ between the side portion 20B and the bottom portion 20C. This arrangement may securely fasten the shield finger 20 to the housing 2.

In the optical transceiver 1, the inner lid 4 rotates rearward around the projection 4b provided in a front side of the inner lid 4, while, the lid 3 rotates frontward with the end 3m as the center of the rotation. This arrangement of two the lids, 3 and 4, may tightly bind the two lids, 3 and 4, with the housing 2 at a plurality of points along the longitudinal direction of the housing 2. Also, this arrangement of the two lids, 3 and 4, may rigidly fix the front end of the lid 3 against the housing 2, which enhances the reliability of the shield finger 20 to fasten the lid 3 to the housing 2.

The shield finger 20 in the finger 23 thereof provides the root portion 23a expanded outward, the warp portion 23b warped inward, and the tip portion 23c warped outward. This arrangement of the finger 23 may securely and tightly make not only the warp portion 23b in contact with the cage in the host system but the tip portion 23c in contact with the housing 2.

Figure 16:
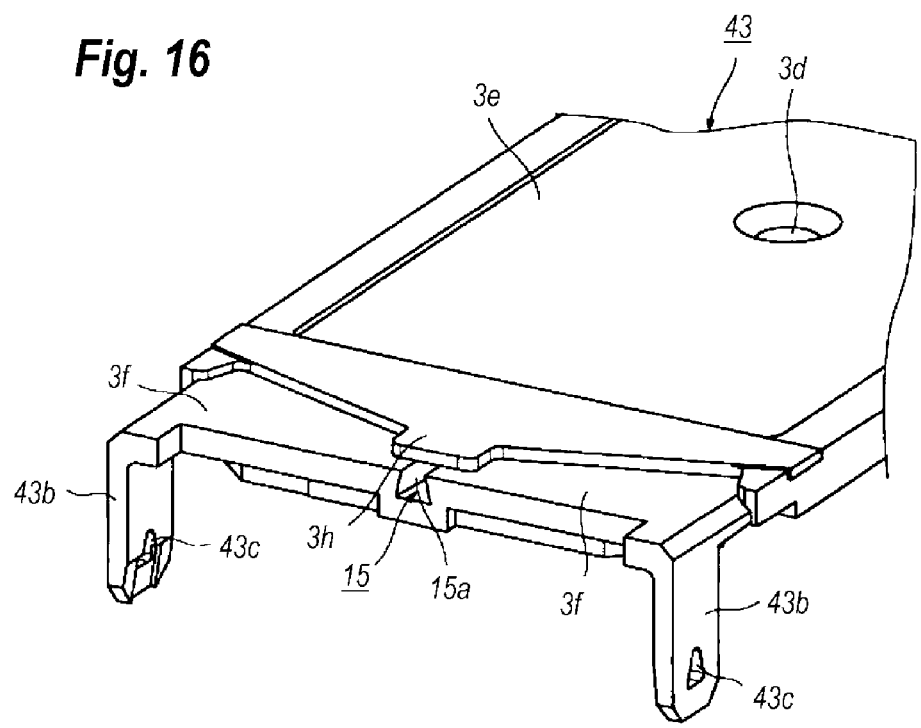
FIG. 16 is a perspective view showing a front end of another lid that provides mechanism to be engaged with a lid.

In the foregoing detailed description, the method and apparatus of the present invention have been described with reference to specific exemplary embodiments thereof. It will, however, be evident that various modifications and changes may be made thereto without departing from the broader spirit and scope of the present invention. For instance, the embodiment provides the leg 3b with the hook 3c in the tip thereof, while, the housing 2 provides the upper and lower receptions, 2c and 2d. Receiving the leg 3b with the upper reception 2c and engaging the hook 3c with the lower reception 2d, the lid 3 may be assembled with the housing 2. However, a mechanism to fasten the lid 3 to the housing 2 is not restricted to those arrangements. FIG. 16 is a perspective view showing a front end of the lid 43 that provides another mechanism to engage a lid 43 with the housing 2. The lid 43 shown in FIG. 16 provides another leg 43b with an opening 43c in an end thereof. Although not shown in FIG. 16, the housing 2 may provide a projection in an outer surface of the side 2b, where the projection is to be inserted into the opening 43c to assemble the lid 43 with the housing 2.

Also, the embodiment described above provides the inner lid 4 that provides the projection 4b with the arched surface 4c; but shapes of the projection 4b and those of the cut 2f in the housing 2 are not restricted to those arrangements. The inner lid 4 may provide a cut while the housing 2 may provide a projection engaged with the cut in the inner lid 4. The present specification and figures are accordingly to be regarded as illustrative rather than restrictive.

What is claimed is:

1. An optical transceiver, comprising:
   a housing having a bottom and a pair of sides built from respective sides of the bottom;
   a lid provided on the sides of the housing, the lid and the housing forming a space within which optical components and electrical components are enclosed, the lid providing a pocket; and
   a shield finger surrounding the lid and the housing, the shield finger fastening the lid to the housing, the shield finger having two ends facing to each other, the ends having tabs that are hooked within the pocket of the lid,
   wherein the pocket in the lid is formed by two slopes extending from a surface of the lid, the slopes making acute angles against the surface, and
   wherein the tabs in the shield finger are bent in acute angles corresponding to the acute angles of the slopes of the pocket, the tab being hooked with the slopes in the pocket.

2. The optical transceiver according to claim 1,
   wherein the shield finger provides a top portion extending along the lid, side portions extending along the sides of the housing, and a bottom portion extending along the bottom of the housing,
   wherein the top portion and the side portions of the shield finger each make angles that are smaller than angles formed by the side portions and the bottom portion of the shield finger.

\* \* \* \* \*